(12) United States Patent
Sheng et al.

(10) Patent No.: US 12,326,783 B2
(45) Date of Patent: Jun. 10, 2025

(54) METHOD, ELECTRONIC DEVICE, AND COMPUTER PROGRAM PRODUCT FOR COLLECTING TRAINING DATA

(71) Applicant: Dell Products L.P., Round Rock, TX (US)

(72) Inventors: Spencer Sheng, Shanghai (CN); Stefanie Menghuan Chen, Shanghai (CN); Kay Ke Shan, Shanghai (CN); Jiacheng Ni, Shanghai (CN); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/137,575

(22) Filed: Apr. 21, 2023

(65) Prior Publication Data
US 2023/0342251 A1 Oct. 26, 2023

(30) Foreign Application Priority Data
Apr. 22, 2022 (CN) .......................... 202210430970.X

(51) Int. Cl.
*G06F 11/00* (2006.01)
*G06F 11/14* (2006.01)

(52) U.S. Cl.
CPC ................ *G06F 11/1415* (2013.01)

(58) Field of Classification Search
CPC .................................................. G06F 11/1415
See application file for complete search history.

(56) References Cited

U.S. PATENT DOCUMENTS 11,128,737 B1 * 9/2021 Fox ........................ G06F 18/29

OTHER PUBLICATIONS

U.S. Appl. No. 18/095,035, filed Jan. 10, 2023, entitled "AI Bug-Fix Positioning by LSTM."

* cited by examiner

*Primary Examiner* — Amine Riad
(74) *Attorney, Agent, or Firm* — Krishnendu Gupta; Lesley Leonessa

(57) ABSTRACT

Embodiments of the present disclosure relate to a method, an electronic device, and a computer program product for collecting training data. The method for collecting training data provided in embodiments of the present disclosure includes: scanning a plurality of data sources to acquire information relating to a plurality of training data to be collected, and creating a collection list based on the information, the collection list including at least a plurality of identifiers of the plurality of training data and a plurality of storage locations of the plurality of training data in the plurality of data sources. The method further includes: collecting the plurality of training data from the plurality of data sources based at least on the collection list.

20 Claims, 6 Drawing Sheets

| Identifier | Collection status | Failure details | Time stamp |
|---|---|---|---|
| 1 | Success | N/A | 11-21-2021 08:34:21 |
| 2 | Failure | Error details | 11-21-2021 14:34:21 |
| ... | ... | ... | ... |
| P | Success | N/A | 11-25-2021 07:55:14 |

FIG. 3B

METHOD, ELECTRONIC DEVICE, AND COMPUTER PROGRAM PRODUCT FOR COLLECTING TRAINING DATA

TECHNICAL FIELD

Embodiments of the present disclosure relate to the field of artificial intelligence, and more particularly to a method, an electronic device, and a computer program product for collecting training data.

BACKGROUND

Projects based on artificial intelligence (AI) usually involve collection of training data. For example, a distributed operating system (such as a test system) for horizontally scalable storage generates a large amount of test data from different platforms such as, for example, a defect tracking management system JIRA, a search engine, a network file sharing storage platform, and an object storage platform. If these data are desired to be used as training data for model training, the required data needs to be collected from all these platforms.

SUMMARY OF THE INVENTION

In a first aspect of the present disclosure, a method for collecting training data is provided. The method includes: scanning a plurality of data sources to acquire information relating to a plurality of training data to be collected. The method further includes: creating a collection list based on the information, the collection list comprising at least a plurality of identifiers of the plurality of training data and a plurality of storage locations of the plurality of training data in the plurality of data sources. The method further includes: collecting the plurality of training data from the plurality of data sources based at least on the collection list.

In a second aspect of the present disclosure, an electronic device or system is provided. The electronic device includes a processor and a memory coupled to the processor. The memory has instructions stored therein which, when executed by the processor, cause the device to perform actions. The actions include: scanning a plurality of data sources to acquire information relating to a plurality of training data to be collected. The actions further include: creating a collection list based on the information, the collection list comprising at least a plurality of identifiers of the plurality of training data and a plurality of storage locations of the plurality of training data in the plurality of data sources. The actions further include: collecting the plurality of training data from the plurality of data sources based at least on the collection list.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the drawings:

FIG. 3B illustrates a schematic diagram of a collection status table according to some embodiments of the present disclosure;

DETAILED DESCRIPTION

Figure 1:
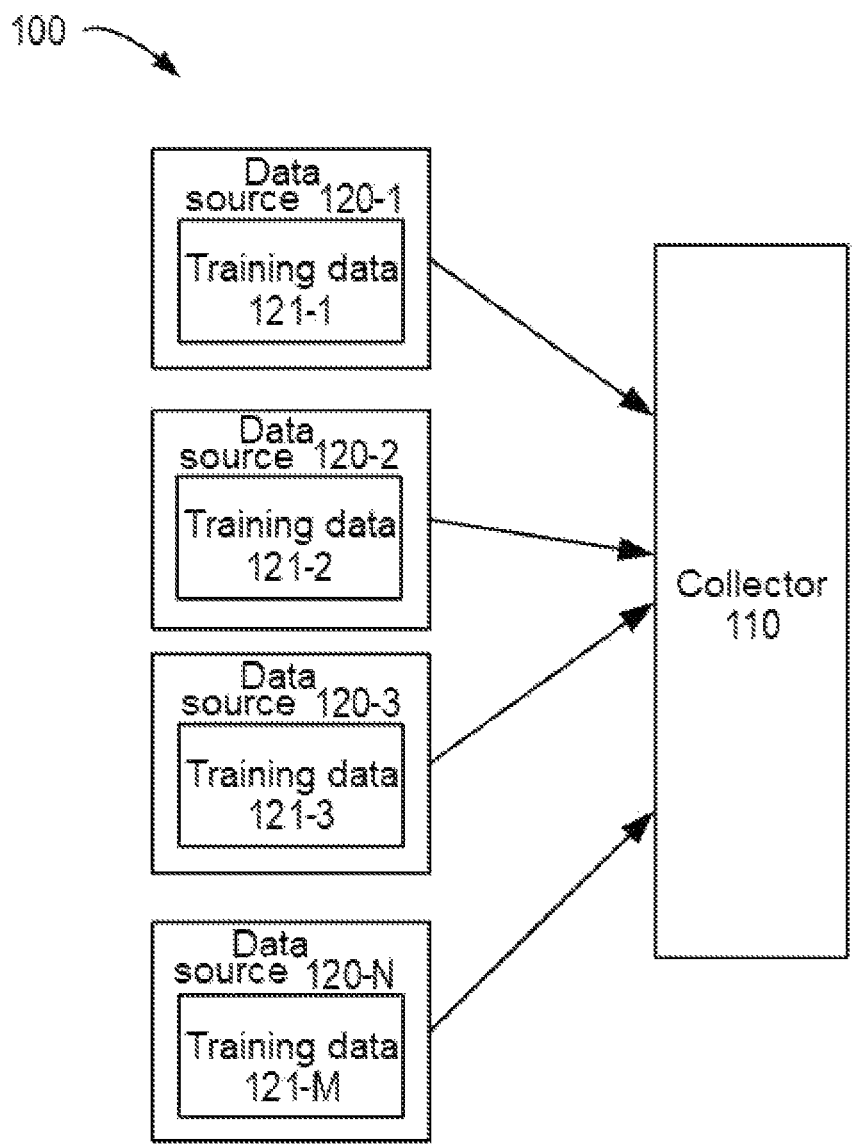
FIG. 1 illustrates a schematic diagram of an example environment in which embodiments of the present disclosure may be implemented.

The principles of the present disclosure will be described below with reference to several example embodiments illustrated in the accompanying drawings. Although preferred embodiments of the present disclosure are illustrated in the accompanying drawings, it should be understood that these embodiments are described merely to enable those skilled in the art to better understand and then implement the present disclosure, and do not limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

The collection of a large amount of on-line data is important to providing training data to an AI system. The data that needs to be collected is typically stored in multiple platforms, and only the JIRA system among them can tag the data as structured data. Collecting data from different platforms (especially from unstructured platforms) may consume a lot of time (e.g., 1 to 3 days, or longer). In addition, data collection may be interrupted due to many reasons such as network and system maintenance, manual interruptions, etc. Once data collection is interrupted, it is difficult to track where to start again. As a result, data collection usually needs to be restarted, thus leading to higher time costs and wasted resources.

In addition, in model training, filtering of the training data is usually required. Therefore, basic data filtering needs to be supported during data collection. If a data filter is updated, it is desirable to only collect incremental data instead of having to restart collecting all the data again.

Embodiments of the present disclosure present a solution for collecting training data. According to embodiments of the present disclosure, a plurality of data sources are first scanned so as to acquire information relating to a plurality of training data to be collected. Then, based on this information, a collection list including identifiers of the training data and storage locations of the training data in the data sources is created. The training data are collected from the plurality of data sources based on the collection list. According to the embodiments described here, it can be ensured that the training data to be collected can be tracked based on the collection list even if the collection is interrupted.

The basic principle and some example implementations of the present disclosure will be described below with reference to the accompanying drawings. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of an example environment in which embodiments of the present disclosure may be implemented. As shown in FIG. 1, environment 100 includes collector 110, data source 120-1, data source 120-2, data source 120-3, and data source 120-N, which may also be referred to collectively or individually as "data sources 120," where N is a natural number.

In some embodiments, data sources 120 may be located on different platforms such as JIRA, ElasticSearch, network file sharing storage, object storage, etc. In some embodiments, collector 110 may be arranged jointly with any one of data sources 120. In some embodiments, collector 110 may be arranged separately from data sources 120.

Collector 110 may collect training data 121-1, training data 121-8, training data 121-3, and training data 121-M, which may be referred to collectively or individually as "training data 121," from data source 120-1, data source 120-2, data source 120-3, and data source 120-N, respectively, where M is a natural number.

It should be understood that while only one training data 121 is illustrated in FIG. 1 in each data source 120, this is for illustrative purposes only and does not imply any limitation to the scope of the present disclosure. For example, one or more training data 121 may exist in one data source 120.

It should be understood that the structure and functions of environment 100 are described for illustrative purposes only and do not imply any limitation to the scope of the present disclosure. For example, the embodiments of the present disclosure may also be applied to an environment different from environment 100. Further, while only four data sources 120 and four training data 121 are illustrated in FIG. 1, the present disclosure is not limited in this aspect, and more or fewer data sources 120 and more or fewer training data 121 may be included.

Figure 2:
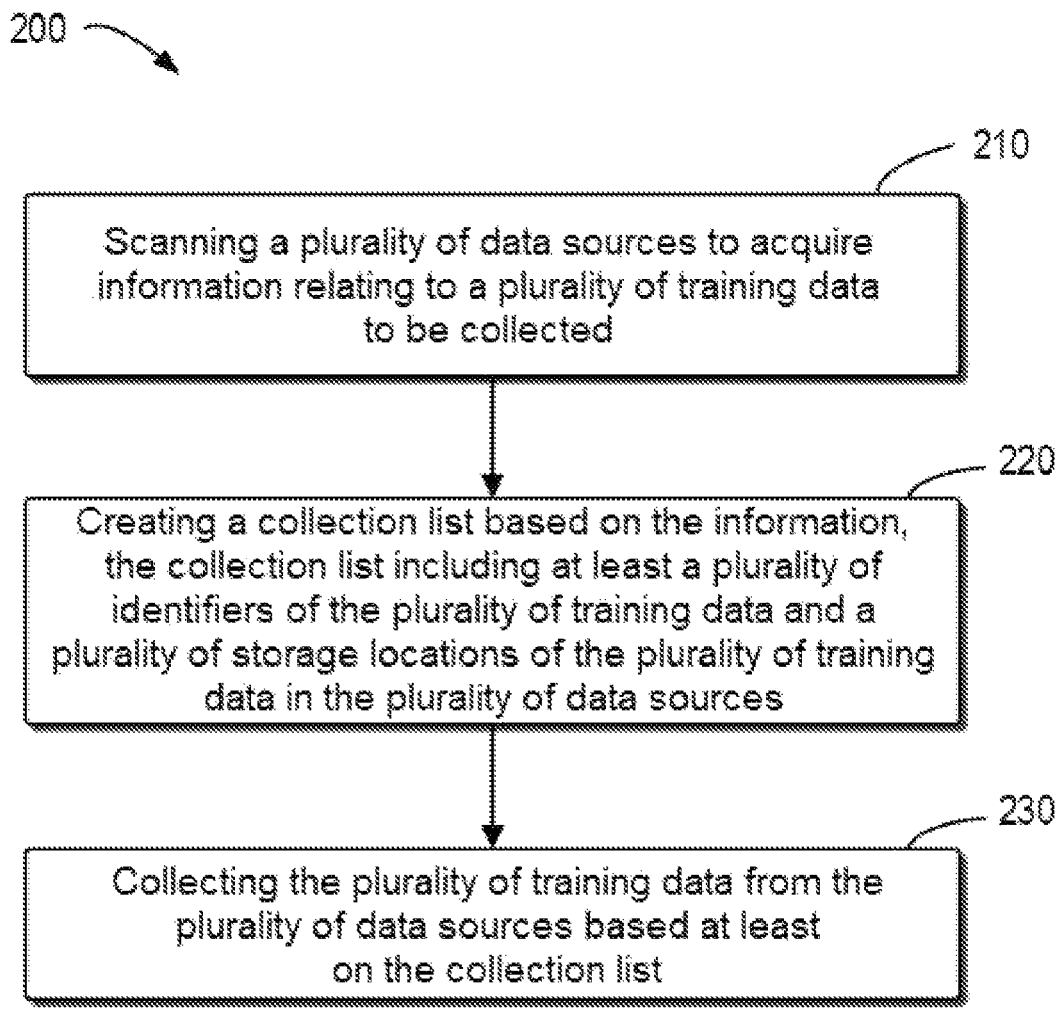
FIG. 2 illustrates a flow chart of an example method for collecting training data according to embodiments of the present disclosure.

FIG. 2 illustrates a flow chart of example method 200 for collecting training data according to an embodiment of the present disclosure. Method 200 may be implemented by, e.g., collector 110 as shown in FIG. 1. It should be understood that method 200 may also include additional actions not shown and/or may omit actions shown, and the scope of the present disclosure is not limited in this regard. Method 200 is described in detail below in conjunction with FIG. 1 and FIG. 3A.

At block 210, a plurality of data sources 120 are scanned by collector 110 to acquire information relating to a plurality of training data 121 to be collected. Such information may include data source 120 in which training data 121 is located, a storage location of that training data 121 in that data source 120, a name and a type of that training data 121, and the like.

In some embodiments, training data 121 may be bug data for training a bug classification model. At this point, the type of training data 121 may be the classification type of the bug data.

It should be understood that the above classification type is an example only and does not imply any limitation to the scope of the present disclosure, and that there may be other suitable classification types. Further, depending on the specific implementation of training data 121, the information relating to training data 121 may also include any other information serving as a sample for model training.

At block 220, a collection list is created by collector 110 based on the information acquired at block 210. The collection list includes at least a plurality of identifiers of the plurality of training data 121 and a plurality of storage locations of the plurality of training data 121 in the plurality of data sources 120.

Figure 3A:
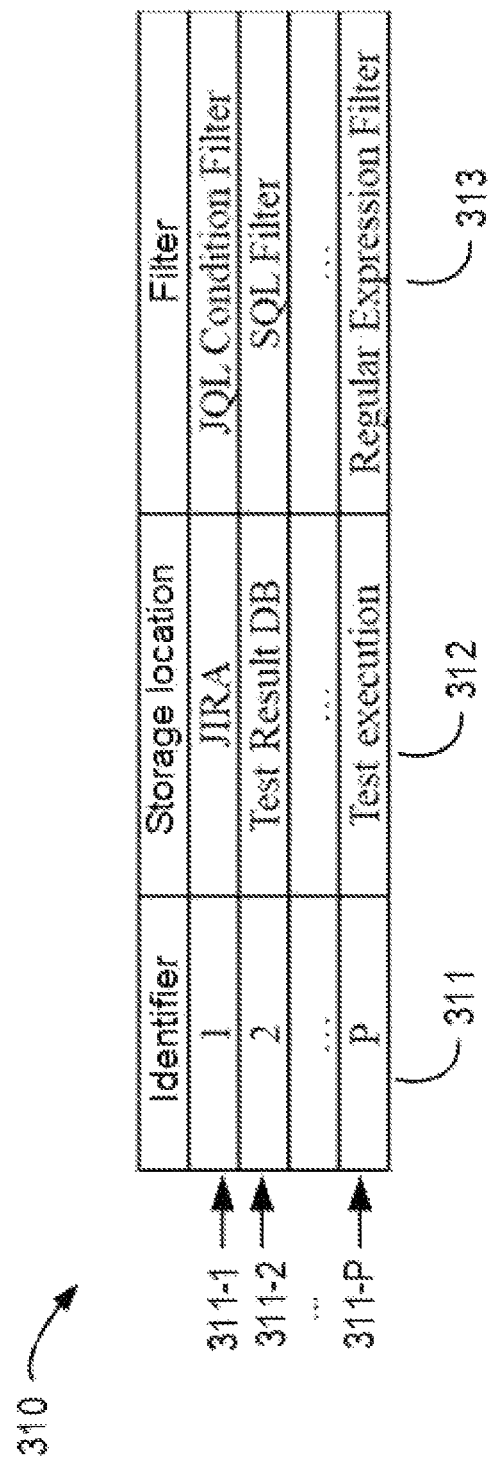
FIG. 3A illustrates a schematic diagram of a collection list according to some embodiments of the present disclosure.

FIG. 3A illustrates a schematic diagram of collection list 310 according to some embodiments of the present disclosure. As shown in FIG. 3A, collection list 310 includes identifier 311-1, identifier 311-2, and identifier 311-P, which may also be referred to collectively or individually as "identifiers 311," where P is a natural number. Collection list 310 also includes a plurality of storage locations 312. Although storage locations 312 are illustrated in FIG. 3A by way of the storage name for training data 121 in data source 120, this is for illustrative purposes only and does not imply any limitation to the scope of the present disclosure. For example, storage location 312 may also be recorded in the form of a storage address, as long as the specific location of training data 121 to be collected in data source 120 can be determined based on that storage location 312.

In some embodiments, collection list 310 may be implemented in a JavaScript Object Notation (JSON) file format.

In some embodiments, collection list 310 may also include a plurality of names 313 of a plurality of filters. The plurality of filters are used to filter the plurality of training data 121. The filters may be any known or unknown filters, and the scope of the present disclosure is not limited in this respect. In this manner, the training data may be filtered using the recorded filters during collection of the training data.

In some embodiments, collection list 310 may also include the type (not shown) of training data 121. The type of training data 121 may be the classification type of the bug data as previously described and will not be repeated here.

Returning to FIG. 2, at block 230, the plurality of training data 121 are collected by collector 110 from the plurality of data sources 120 based on collection list 310. For example, training data 121-1 is stored in data source 120-1 at the storage location "JIRA" as shown in FIG. 3A, and identifier 311-1 corresponds to training data 121-1. Collector 110 may collect training data 121-1 corresponding to identifier 311-1 of "1" from the storage location "JIRA."

It should be understood that although identifiers 311 are illustrated in FIG. 3A in the form of natural numbers 1 to P, this is for illustrative purposes only and does not imply any limitation to the scope of the present disclosure. For example, identifiers 311 may also be shown in an alphabetical form or other forms.

In this manner, it can be ensured that the training data to be collected can be tracked based on the collection list even if the collection is interrupted.

In some embodiments, collector 110 may create a collection status table based on the collection of training data 121. FIG. 3B illustrates a schematic diagram of collection status table 320 according to some embodiments of the present disclosure. Collection status table 320 records at least a plurality of identifiers 311 and a plurality of collection statuses 322 corresponding to the plurality of identifiers 311. Alternatively, instead of creating collection status table 320, the plurality of collection statuses 322 may be recorded in collection list 310. The plurality of collection statuses 322 may be initially set to failure. In some embodiments, collection status table 320 may also include time stamp 324 for the time when the data was collected.

In some embodiments, in response to not successfully collecting first training data 121-2 corresponding to first identifier 311-2 from first data source 120-2 of the plurality of data sources 120, first collection status 322 corresponding to first identifier 311-2 is set to failure by collector 110 in collection status table 320. In response to successfully collecting second training data 121-1 corresponding to second identifier 311-1 from second data source 120-1 of the plurality of data sources 120, second collection status 322 corresponding to second identifier 311-1 is set to success in collection status table 320.

Figure 4:
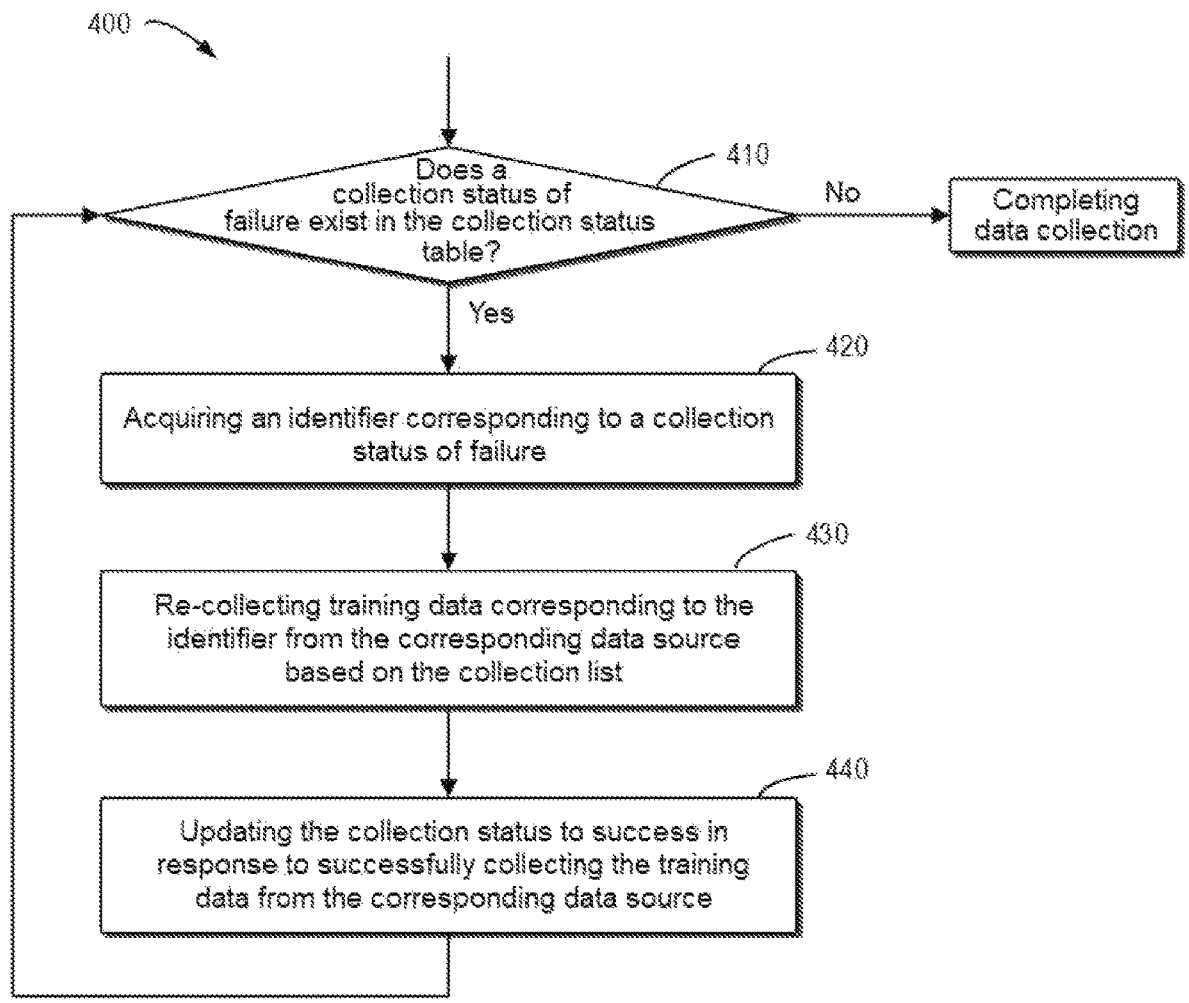
FIG. 4 illustrates a flow chart of an example method for collecting training data according to some embodiments of the present disclosure.

In some embodiments, collector 110 may collect training data 121 based on collection list 310 and collection status table 320. FIG. 4 illustrates a flow chart of example method 400 for collecting training data 121 according to some embodiments of the present disclosure. Method 400 may be regarded as an example implementation of block 230 in method 200. Method 400 may further include additional actions not shown and/or may omit actions shown, and the scope of the present disclosure is not limited in this regard. Method 400 will be described in detail below with reference to FIG. 1, FIG. 3A, and FIG. 3B.

As shown in FIG. 4, at block 410, collector 110 determines whether collection status 322 of failure exists in collection status table 320. In some embodiments, collection status table 320 may also include failure details. The failure details may indicate the cause of the failure and the like. The failure details corresponding to collection status 322 of success may be marked as "Not Applicable" or "N/A." In this manner, according to the cause of failure, whether the training data may be re-collected, or the length of time after which the training data should be re-collected may be determined.

In response to determining that collection status 322 of failure exists in collection status table 320, identifier 311-2 corresponding to that collection status 322 is acquired by collector 110 at block 420. Then, at block 430, training data 121-2 corresponding to identifier 311-2 is re-collected by collector 110 from corresponding data source 120-2 based on collection list 310.

In some embodiments, the re-collection of training data 121 from data source 120 may occur after a predetermined time period (e.g., 2 hours) since a previous collection. In some other embodiments, the collection failure may be due to the data source being unavailable due to network and system maintenance, manual interruptions, and the like. Thus, the re-collection of training data 121 from data source 120 may start after it is detected that data source 120 is available. In this manner, the number of times of collection failures can be reduced, and thus computing resources can be conserved.

In response to successfully collecting training data 121-2 from data source 120-2, collection status 322 corresponding to identifier 311-2 is updated to success by collector 110 at block 440.

In this manner, in the event of a data collection interruption, it is possible to only collect the training data that was not successfully collected without having to restart collecting all the data.

Method 400 may then return to block 410. In some embodiments, collection of the plurality of training data 121 is completed in response to no collection status 322 of failure existing in collection status table 320. In some embodiments, method 400 may complete collection in response to a predetermined number of cycles being reached or the duration reaching a predetermined time threshold.

Figure 5:
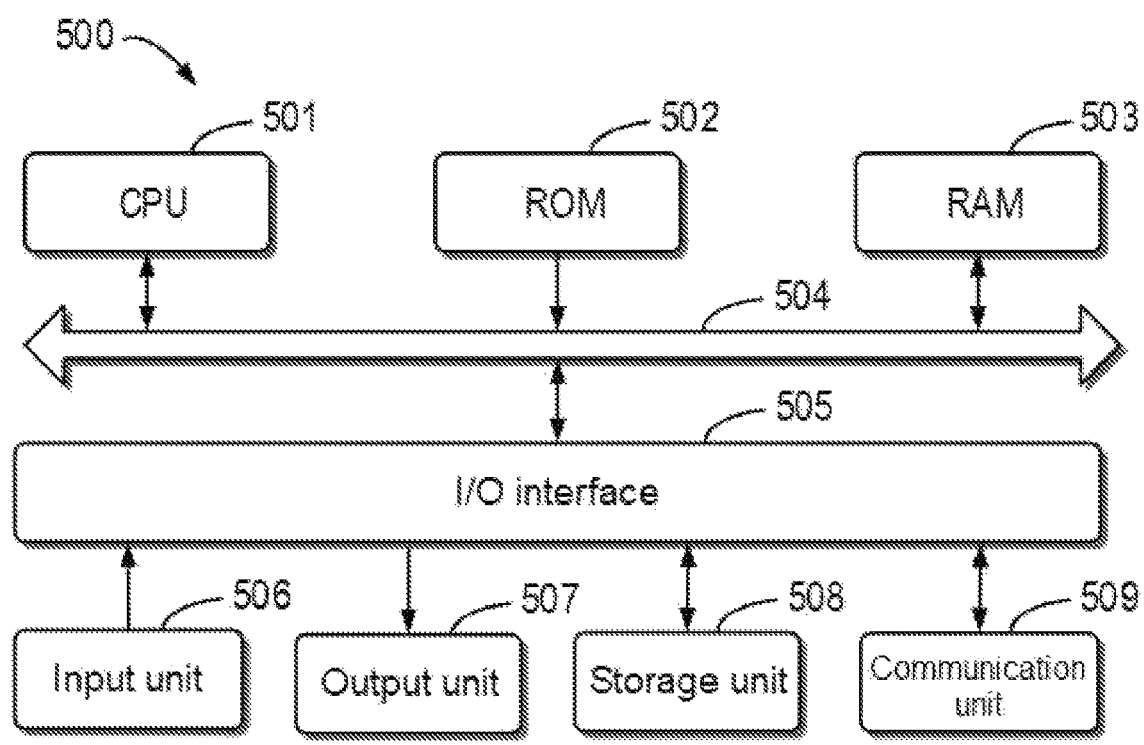
FIG. 5 illustrates a block diagram of an example device that may be used to implement embodiments of the disclosure.

FIG. 5 illustrates a schematic block diagram of example device 500 that may be used to implement embodiments of the present disclosure. For example, collector 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as method 200 and method 400, may be performed by processing unit 501. For example, in some embodiments, method 200 and method 400 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of method 200 and method 400 described above may be performed when the computer program is loaded into RAM 503 and executed by CPU 501.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method for collecting training data, comprising:
   scanning a plurality of data sources to acquire information relating to a plurality of training data to be collected;
   creating a collection list based on the information, the collection list comprising at least a plurality of identifiers of the plurality of training data and a plurality of storage locations of the plurality of training data in the plurality of data sources, wherein the collection list enables tracking and resuming interrupted collection of the training data; creating a collection status table recording collection success or failure status for each identifier; and collecting the plurality of training data from the plurality of data sources based at least on the collection list and the collection status table, wherein collecting comprises: re-collecting only training data having a failure status after a predetermined time period since a previous collection attempt.

2. The method according to claim 1, wherein the collection list further comprises a plurality of names of a plurality of filters for filtering the plurality of training data.

3. The method according to claim 1, wherein collecting the training data from the plurality of data sources comprises:

updating the collection status table based on the collection of the training data, the collection status table recording at least the plurality of identifiers and the plurality of collection statuses corresponding to the plurality of identifiers.

4. The method according to claim 3, wherein collecting the plurality of training data from the plurality of data sources further comprises:

setting, in response to not successfully collecting first training data corresponding to a first identifier from a first data source of the plurality of data sources, a first collection status corresponding to the first identifier to failure in the collection status table; and setting, in response to successfully collecting second training data corresponding to a second identifier from a second data source of the plurality of data sources, a second collection status corresponding to the second identifier to success in the collection status table.

5. The method according to claim 4, further comprising:
determining whether a collection status of failure exists in the collection status table;

acquiring the first identifier corresponding to the first collection status in response to determining that the first collection status of failure exists in the collection status table;

re-collecting the first training data corresponding to the first identifier from the first data source based on the collection list; and updating the first collection status to success in response to successfully collecting the first training data from the first data source.

6. The method according to claim 5, wherein re-collecting the first training data corresponding to the first identifier from the first data source comprises:

re-collecting the first training data from the first data source after a predetermined time period since a previous collection.

7. The method according to claim 4, further comprising:
determining whether a collection status of failure exists in the collection status table; and completing collection of the plurality of training data in response to no collection status of failure existing in the collection status table.

8. An electronic device, comprising:
a processor; and
a memory coupled to the processor, the memory having instructions stored therein, wherein the instructions, when executed by the processor, cause the device to perform actions comprising:

scanning a plurality of data sources to acquire information relating to a plurality of training data to be collected;

creating a collection list based on the information, the collection list comprising at least a plurality of identifiers of the plurality of training data and a plurality of storage locations of the plurality of training data in the plurality of data sources, wherein the collection list enables tracking and resuming interrupted collection of the training data; creating a collection status table recording collection success or failure status for each identifier; and collecting the plurality of training data from the plurality of data sources based at least on the collection list and the collection status table, wherein collecting comprises: re-collecting only training data having a failure status after a predetermined time period since a previous collection attempt.

9. The device according to claim 8, wherein the collection list further comprises a plurality of names of a plurality of filters for filtering the plurality of training data.

10. The device according to claim 8, wherein collecting the training data from the plurality of data sources comprises:

updating the collection status table based on the collection of the training data, the collection status table recording at least the plurality of identifiers and the plurality of collection statuses corresponding to the plurality of identifiers.

11. The device according to claim 10, wherein collecting the plurality of training data from the plurality of data sources further comprises:

setting, in response to not successfully collecting first training data corresponding to a first identifier from a first data source of the plurality of data sources, a first collection status corresponding to the first identifier to failure in the collection status table; and setting, in response to successfully collecting second training data corresponding to a second identifier from a second data source of the plurality of data sources, a second collection status corresponding to the second identifier to success in the collection status table.

12. The device according to claim 11, wherein the actions further comprise:

determining whether a collection status of failure exists in the collection status table;

acquiring the first identifier corresponding to the first collection status in response to determining that the first collection status of failure exists in the collection status table;

re-collecting the first training data corresponding to the first identifier from the first data source based on the collection list; and updating the first collection status to success in response to successfully collecting the first training data from the first data source.

13. The device according to claim 12, wherein re-collecting the first training data corresponding to the first identifier from the first data source comprises:

re-collecting the first training data from the first data source after a predetermined time period since a previous collection.

14. The device according to claim 11, wherein the actions further comprise:

determining whether a collection status of failure exists in the collection status table; and completing collection of the plurality of training data in response to no collection status of failure existing in the collection status table.

15. A computer program tangibly stored on a computer-readable medium and comprising instructions, wherein the instructions, when executed, by a processor cause the program to:

scan a plurality of data sources to acquire information relating to a plurality of training data to be collected;

create a collection list based on the information, the collection list comprising at least a plurality of identifiers of the plurality of training data and a plurality of storage locations of the plurality of training data in the plurality of data sources, wherein the collection list enables tracking and resuming interrupted collection of the training data; creating a collection status table recording collection success or failure status for each identifier; and collect the plurality of training data from the plurality of data sources based at least on the collection list and the collection status table, wherein collecting comprises: re-collecting only training data having a failure status after a predetermined time period since a previous collection attempt.

16. The computer-readable medium of claim 15 wherein the collection list further comprises a plurality of names of a plurality of filters for filtering the plurality of training data.

17. The computer-readable medium of claim 15 wherein the machine-executable instructions configured to collect the training data from the plurality of data sources are further configured to:

update the collection status table based on the collection of the training data, the collection status table recording at least the plurality of identifiers and the plurality of collection statuses corresponding to the plurality of identifiers.

18. The computer-readable medium of claim 17 wherein the machine-executable instructions configured to collect the training data from the plurality of data sources are further configured to:

set, in response to not successfully collecting first training data corresponding to a first identifier from a first data source of the plurality of data sources, a first collection status corresponding to the first identifier to failure in the collection status table; and set, in response to successfully collecting second training data corresponding to a second identifier from a second data source of the plurality of data sources, a second collection status corresponding to the second identifier to success in the collection status table.

19. The computer-readable medium of claim 18 further configured to:

determine whether a collection status of failure exists in the collection status table;

acquire the first identifier corresponding to the first collection status in response to determining that the first collection status of failure exists in the collection status table;

re-collect the first training data corresponding to the first identifier from the first data source based on the collection list; and update the first collection status to success in response to successfully collecting the first training data from the first data source.

20. The computer-readable medium of claim 19, wherein the machine-executable instructions configured to re-collect the first training data corresponding to the first identifier from the first data source are further configured to:

re-collect the first training data from the first data source after a predetermined time period since a previous collection.

* * * * *